United States Patent
Hirano et al.

(10) Patent No.: US 10,895,323 B2
(45) Date of Patent: Jan. 19, 2021

(54) SHAFT SEALING DEVICE AND ELECTRIC ROTARY MACHINE

(71) Applicants:KABUSHIKI KAISHA TOSHIBA, Minato-ku (JP); Toshiba Energy Systems & Solutions Corporation, Kawasaki (JP)

(72) Inventors: Toshio Hirano, Yokohama (JP); Takeshi Kanasaki, Yokohama (JP); Kazunori Ikeda, Yokohama (JP); Hideki Chiba, Yokohama (JP); Kenji Yoshimizu, Yokohama (JP)

(73) Assignees: KABUSHIKI KAISHA TOSHIBA, Minato-ku (JP); Toshiba Energy Systems & Solutions Corporation, Kawasaki (JP)

( * ) Notice: Subject to any disclaimer, the term of this patent is extended or adjusted under 35 U.S.C. 154(b) by 109 days.

(21) Appl. No.: 16/228,851

(22) Filed: Dec. 21, 2018

(65) Prior Publication Data
US 2019/0195364 A1 Jun. 27, 2019

(30) Foreign Application Priority Data

Dec. 26, 2017 (JP) ................................ 2017-249836

(51) Int. Cl.
*F16J 15/16* (2006.01)
*F16J 15/32* (2016.01)
(Continued)

(52) U.S. Cl.
CPC ............ *F16J 15/162* (2013.01); *F16J 15/32* (2013.01); *F16J 15/40* (2013.01); *F16J 15/441* (2013.01);
(Continued)

(58) Field of Classification Search
CPC .. F16J 15/162; F16J 15/16; F16J 15/50; F16J 15/52; F16J 15/324; F16J 15/304;
(Continued)

(56) References Cited

U.S. PATENT DOCUMENTS 5,039,115 A * 8/1991 Hebert .................... F01D 11/00
 277/347
5,509,664 A * 4/1996 Borkiewicz ............ F16J 15/442
 277/543
(Continued)

FOREIGN PATENT DOCUMENTS

JP 57-93076 U 6/1982
JP 6-193743 7/1994
(Continued)

OTHER PUBLICATIONS

Sano, T., et al. "Rubbing-Caused Rotor Vibration Restraint Technology at Hydrogen Seal Portion of Turbine Generator", The Japan Society of Mechanical Engineers No. 09-7027, 2010, pp. 1655-1661 (with Machine Generated English Translation).
(Continued)

*Primary Examiner* — Nathan Cumar
(74) *Attorney, Agent, or Firm* — Oblon, McClelland, Maier & Neustadt, L.L.P.

(57) ABSTRACT

In the shaft sealing device according to one embodiment, a seal ring includes a machine-interior-side seal ring member, and a machine-exterior-side seal ring member. A ring gap is left between the machine-interior-side seal ring member and the machine-exterior-side seal ring member. A seal gap is left between an inner peripheral surface of the machine-interior-side seal ring member and an outer peripheral surface of the rotary shaft and between an inner peripheral surface of the machine-exterior-side seal ring member and the outer peripheral surface of the rotary shaft. The inner peripheral surface of the machine-interior-side seal ring (Continued)

member is a flat surface that generally follows along the outer peripheral surface of the rotary shaft, and a groove extending along a direction of rotation of the rotary shaft is formed in the inner peripheral surface of the machine-exterior-side seal ring member.

6 Claims, 13 Drawing Sheets

(51) Int. Cl.
    *F16J 15/44*     (2006.01)
    *F16J 15/40*     (2006.01)
    *H02K 7/18*     (2006.01)
    *H02K 9/12*     (2006.01)
    *H02K 5/124*     (2006.01)
    *H02K 9/08*     (2006.01)

(52) U.S. Cl.
    CPC ........... *H02K 5/124* (2013.01); *H02K 7/1823* (2013.01); *H02K 9/12* (2013.01); *H02K 9/08* (2013.01)

(58) Field of Classification Search
    CPC .......... F16J 15/40; F16J 15/30; F16J 15/3212; F16J 15/3216; F16J 15/322; F16J 15/44; F16J 15/441; F16J 15/443; H02K 5/124; H02K 5/12; H02K 7/1823; H02K 7/183; H02K 9/00; H02K 9/12; H02K 9/08; H02K 9/10

USPC ........................................................ 277/387
    See application file for complete search history.

(56) References Cited

U.S. PATENT DOCUMENTS

| | | | |
|---|---|---|---|
| 5,516,118 A * | 5/1996 | Jones .................. | F16J 15/3488 277/400 |
| 6,431,550 B1 * | 8/2002 | Tong ...................... | F16J 15/442 277/346 |
| 10,539,034 B2 * | 1/2020 | Miller .................... | F16J 15/442 |
| 2015/0167846 A1 * | 6/2015 | Haynes ................... | F16J 15/40 277/350 |

FOREIGN PATENT DOCUMENTS

| | | |
|---|---|---|
| JP | 07-75291 | 3/1995 |
| JP | 10-14158 | 1/1998 |
| JP | 2008-301575 A | 12/2008 |

OTHER PUBLICATIONS

Extended European Search Report dated May 16, 2019 in European Patent Application No. 18213450.2, 10 pages.

* cited by examiner

SHAFT SEALING DEVICE AND ELECTRIC ROTARY MACHINE

CROSS REFERENCE TO RELATED APPLICATIONS

This application is based upon the benefit of priority to Japanese Patent Application No. 2017-249836 filed on Dec. 26, 2017. Thus, the application claims the benefit of priority therefrom. The entire content of the stated Japanese patent application is incorporated herein by reference.

FIELD

Embodiments of the present invention relate to shaft sealing devices and electric rotary machines.

BACKGROUND

Electric rotary machines include a device such as a turbine electric generator and are configured such that a rotor rotates inside a stator, for example. In an electric rotary machine, such as a turbine electric generator, the interior thereof is filled with a hydrogen gas, and this filling hydrogen gas is used as a cooling gas that cools a rotor and a stator. In an electric rotary machine, a shaft sealing device is provided to prevent a cooling gas, such as a hydrogen gas, from leaking to the outside.

An electric rotary machine 1 according to a related art will be described with reference to FIG. 12 of the accompanying drawings. In FIG. 12, the right-left direction is a horizontal direction (x) and substantially corresponds to the axial direction extending along the center axis of rotation AX of a rotor of the electric rotary machine 1. In addition, in FIG. 12, the up-down direction is a vertical direction (z) and substantially corresponds to a part of the radial direction perpendicular to the center axis of rotation AX.

As illustrated in FIG. 12, the electric rotary machine 1 includes a rotary shaft 4 that penetrates an electric rotary machine casing 3, and a shaft sealing device 10J provided between the electric rotary machine casing 3 and the rotary shaft 4.

In the electric rotary machine 1, a gas chamber provided on a machine interior side IN (interior) of the electric rotary machine casing 3 is filled with a cooling gas. In the electric rotary machine casing 3, a pressure $P_{IN}$ on the machine interior side IN is higher than a pressure $P_{OUT}$ (atmospheric pressure) on a machine exterior side OT (exterior) ($P_{IN} > P_{OUT}$). A stator (not illustrated) is provided inside the electric rotary machine casing 3. In the stator, a stator coil (not illustrated) is disposed on a stator core (not illustrated).

The rotary shaft 4 has a columnar outer shape and is rotatably supported by a bearing (not illustrated) such that the axial direction of the rotary shaft 4 extending along the center axis of rotation AX coincides with the horizontal direction (x). The rotary shaft 4 has a rotor (not illustrated). In the rotor, a rotor coil (not illustrated) is disposed on a rotor core (iron core; not illustrated). The rotor is housed, for example, in the stator, and the electricity is generated, for example, as the rotor rotates along with the rotary shaft 4. Inside the electric rotary machine casing 3, the rotor and the stator are cooled by the cooling gas filling the machine interior side IN of the electric rotary machine casing 3. For example, the rotor and the stator are cooled as the cooling gas flows through a rotor cooling channel (not illustrated) formed in the rotor and a stator cooling channel (not illustrated) formed in the stator, respectively.

The shaft sealing device 10J is provided to seal the cooling gas inside the electric rotary machine casing 3. The shaft sealing device 10J is a stationary member and is disposed on the electric rotary machine casing 3. The shaft sealing device 10J is interposed between the rotary shaft 4 and the electric rotary machine casing 3 provided around the rotary shaft 4 to prevent the cooling gas from leaking from the machine interior side IN to the machine exterior side OT of the electric rotary machine casing 3.

An example of the shaft sealing device 10J of the electric rotary machine 1 according to the related art will be described with reference to FIG. 13 of the accompanying drawings. FIG. 13 is an enlarged cross-sectional view taken along a vertical plane (xz plane). In FIG. 13, the right-left direction (x) corresponds to the axial direction, and the up-down direction (z) corresponds to a part of the radial direction.

As illustrated in FIG. 13, the shaft sealing device 10J is of a floating type, and a seal ring 30 and a coil spring 80 are housed in a seal casing 20. Details of the components constituting the shaft sealing device 10J will be described in order.

The seal casing 20 is an annular member and is provided around the rotary shaft 4. Specifically, the seal casing 20 is disposed to surround the rotary shaft 4 in a direction of rotation T (circumferential direction) at a position closer to the outside than an outer peripheral surface of the rotary shaft 4 in the radial direction (z). An air gap G is left between an inner peripheral surface P20 of the seal casing 20 and an outer peripheral surface P4 of the rotary shaft 4.

A seal casing chamber 21 is formed inside the seal casing 20. An oil inlet 211 is formed in the seal casing 20 at a position closer to the outside than the seal casing chamber 21 in the radial direction (z). The oil inlet 211 communicates with the seal casing chamber 21. In the seal casing 20, a sealing oil SO is supplied into the seal casing chamber 21 through the oil inlet 211. The sealing oil SO having a higher pressure than the cooling gas is supplied, details of which will be described later.

A seal casing opening 22 is formed in the seal casing 20 at a position closer to the interior than the seal casing chamber 21 in the radial direction (z). The seal casing opening 22 communicates with the seal casing chamber 21. The width of the seal casing opening 22 in the axial direction (x) is smaller than the width of the seal casing chamber 21 in the axial direction (x).

The seal ring 30 is an annular member and is housed in the seal casing chamber 21 of the seal casing 20 such that the seal ring surrounds the rotary shaft 4. Specifically, similar to the seal casing 20, the seal ring 30 surrounds the rotary shaft 4 in the direction of rotation T at a position closer to the outside than the outer peripheral surface of the rotary shaft 4 in the radial direction (z).

In the seal ring 30, a portion located outward in the radial direction (z) and a portion located inward in the radial direction (z) differ from each other in the width in the axial direction (x). The width, in the axial direction (x), of the portion located outward in the radial direction (z) is greater than the width, in the axial direction (x), of the portion located inward in the radial direction (z).

The portion of the seal ring 30 that is located outward in the radial direction (z) is housed inside the seal casing chamber 21. The portion of the seal ring 30 that is located inward in the radial direction (z) penetrates the seal casing opening 22.

Although not illustrated, the seal ring 30 includes an upper half and a lower half, and the upper half and the lower half are tightened and coupled to each other with a tightening member, such as a bolt.

The seal ring 30 includes a machine-interior-side seal ring member 30a and a machine-exterior-side seal ring member 30b. The machine-interior-side seal ring member 30a is located on the machine interior side IN, which is the interior of the electric rotary machine casing 3 in the electric rotary machine 1. In contrast, the machine-exterior-side seal ring member 30b is located closer to the machine exterior side OT, which is the exterior of the electric rotary machine casing 3, than the machine-interior-side seal ring member 30a in the axial direction (x) of the rotary shaft 4. The machine-interior-side seal ring member 30a and the machine-exterior-side seal ring member 30b are disposed side by side in the axial direction (x). A ring gap RG is left between the machine-interior-side seal ring member 30a and the machine-exterior-side seal ring member 30b. A seal gap SG is left between an inner peripheral surface P30a of the machine-interior-side seal ring member 30a and the outer peripheral surface P4 of the rotary shaft 4, and the seal gap SG is also left between an inner peripheral surface P30b of the machine-exterior-side seal ring member 30b and the outer peripheral surface P4 of the rotary shaft 4.

The inner peripheral surface P30a of the machine-interior-side seal ring member 30a is a flat surface that generally follows along the outer peripheral surface P4 of the rotary shaft 4. In a similar manner, the inner peripheral surface P30b of the machine-exterior-side seal ring member 30b is a flat surface that generally follows along the outer peripheral surface P4 of the rotary shaft 4.

In the ring gap RG, a portion located outward in the radial direction (z) is tapered and formed such that the width in the axial direction (x) decreases from the outer side toward the inner side in the radial direction (z). In the ring gap RG, a portion located inward in the radial direction (z) has a constant width in the axial direction (x).

The coil spring 80 is located around the rotary shaft 4 and housed in the seal casing chamber 21 of the seal casing 20. The coil spring 80 urges the seal ring 30 toward the inner peripheral side in the radial direction (z).

Specifically, the coil spring 80 is housed in the seal casing chamber 21. The coil spring 80 is provided in the tapered portion of the ring gap RG in the seal ring 30 that is located on an outer peripheral side in the radial direction (z). The coil spring 80 urges the machine-interior-side seal ring member 30a and the machine-exterior-side seal ring member 30b inward in the radial direction (z). In addition, the coil spring 80 urges the machine-interior-side seal ring member 30a toward the machine interior side IN in the axial direction (x) and urges the machine-exterior-side seal ring member 30b toward the machine exterior side OT in the axial direction (x).

Although not illustrated, the coil spring 80 urges the upper half of the seal ring 30, and another coil spring 80 urges the lower half of the seal ring 30. The urging force of the coil spring 80 that urges the upper half of the seal ring 30 and the urging force of the coil spring 80 that urges the lower half of the seal ring 30 differ from each other. Typically, to support the seal ring 30, the urging force of the coil spring 80 that urges the lower half of the seal ring 30 is greater than the urging force of the coil spring 80 that urges the upper half of the seal ring 30.

An operation of the above-described shaft sealing device 10J will be described.

When the electric rotary machine 1 is operated, the sealing oil SO is supplied into the seal casing 20 from a supply source (not illustrated). In the seal casing 20, the sealing oil SO is supplied into the seal casing chamber 21 through the oil inlet 211. The sealing oil SO is supplied into the seal casing 20 at a pressure higher than the pressure of the cooling gas filling the interior of the electric rotary machine casing 3. The pressure of the sealing oil SO is, for example, higher than the pressure of the cooling gas by approximately 0.05 MPa. Thus, a resultant force of the urging force of the coil spring 80 and the pressure of the sealing oil SO is exerted on the seal ring 30 in the shaft sealing device 10J.

Specifically, a resultant force Fx in the axial direction (x) and a resultant force Fr in the radial direction (z) are each exerted on the seal ring 30. The resultant force Fx in the axial direction (x) is exerted on the machine-interior-side seal ring member 30a toward the machine interior side IN in the axial direction (x). In a similar manner, the resultant force Fx in the axial direction (x) is exerted on the machine-exterior-side seal ring member 30b toward the machine exterior side OT in the axial direction (x). As a result, the portion of the seal ring 30 that is located inward in the radial direction (z) makes tight contact with the portion of the seal casing 20 that is located inward in the radial direction (z) and in which the seal casing opening 22 is formed. In other words, a side surface S30a of the machine-interior-side seal ring member 30a that is located on the machine interior side IN makes tight contact with a side surface S22a of the seal casing opening 22 that is located on the machine interior side IN. In addition, a side surface S30b of the machine-exterior-side seal ring member 30b that is located on the machine exterior side OT makes tight contact with a side surface S22b of the seal casing opening 22 that is located on the machine exterior side OT.

Aside from the above, the resultant force Fr in the radial direction (z) is exerted on the machine-interior-side seal ring member 30a and the machine-exterior-side seal ring member 30b toward the inner side in the radial direction (z). As a result, the seal ring 30 slides in the radial direction (z) while being in tight contact with the seal casing 20.

In the shaft sealing device 10J, the sealing oil SO, after having been supplied into the seal casing chamber 21, flows into the ring gap RG in the seal ring 30 from the seal casing chamber 21. The sealing oil SO that has flowed into the ring gap RG is supplied to the seal gap SG left between the inner peripheral surface P30a of the machine-interior-side seal ring member 30a and the outer peripheral surface P4 of the rotary shaft 4 and to the seal gap SG left between the inner peripheral surface P30b of the machine-exterior-side seal ring member 30b and the outer peripheral surface P4 of the rotary shaft 4. Thus, an oil film of the sealing oil SO is formed in the seal gap SG. As a result, the shaft sealing device 10J can seal the cooling gas into the machine interior side IN so that the cooling gas does not leak from the machine interior side IN to the machine exterior side OT. The seal ring 30 is pressed toward the outer peripheral side by the pressure of the oil film formed in the seal gap SG. Thus, the seal gap SG is retained between the seal ring 30 and the rotary shaft 4.

In the shaft sealing device 10J of a floating type, a force such as a bearing counterforce is produced due to the rotation of the rotary shaft 4, and thus the seal ring 30 may become eccentric with respect to the rotary shaft 4. In this case, the seal ring 30 moves in the radial direction (z) due to the pressure produced by the oil film formed in the seal gap SG. As a result, in the shaft sealing device 10J, the alignment is corrected automatically to achieve a coaxial state in which the center axis of rotation AX of the rotary shaft 4 coincides with the center axis of the seal ring 30.

For example, when the rotary shaft 4 moves upward, the pressure of the oil film rises in the seal gap SG located on an upper side of the rotary shaft 4, and thus the seal ring 30 located on an upper side of the rotary shaft 4 moves upward. Then, the pressure of the oil film decreases in the seal gap SG located on a lower side of the rotary shaft 4, and thus the seal ring 30 located on a lower side of the rotary shaft 4 moves upward due to the urging force of the coil spring 80. In other words, when the rotary shaft 4 moves, the seal ring 30 also moves to follow the rotary shaft 4. Accordingly, the alignment is corrected automatically as described above.

As already described above, in the shaft sealing device 10J of a floating type, the machine-interior-side seal ring member 30a and the machine-exterior-side seal ring member 30b of the seal ring 30 slide in the radial direction (z) while the seal ring members 30a and 30b are in tight contact with the seal casing 20 in the axial direction (x), respectively. Therefore, friction is produced between the seal casing 20 and the seal ring 30. Consequently, the temperature rises locally therebetween, and seizure may occur. As a result, the alignment may not be corrected automatically, and the sealing of the cooling gas may become insufficient.

To address these issues, a variety of techniques are proposed. Examples include providing a groove having a spiral shape or the like in an inner peripheral surface of the seal ring 30 to increase the pressure effect and forming a coating layer having a small friction coefficient on a slide surface of the seal casing 20.

However, an increase in the capacity of the electric rotary machine 1 has led to an increase in the pressure of the cooling gas filling the machine interior side IN of the electric rotary machine casing 3. In association therewith, the pressure of the sealing oil SO supplied into the seal casing 20 is also increased. Accordingly, the pressing force with which the seal ring 30 presses the seal casing 20 is increasing, and thus the frictional force produced between the seal ring 30 and the seal casing 20 is increasing. As a result, the alignment may not be corrected automatically, and the sealing of the cooling gas may become insufficient.

As described above, the pressure $P_{IN}$ on the machine interior side IN filled with the cooling gas in the electric rotary machine casing 3 of the electric rotary machine 1 is higher than the pressure $P_{OUT}$ (atmospheric pressure) on the machine exterior side OT located outside the electric rotary machine casing 3. Therefore, in the shaft sealing device 10J, a difference ($\Delta Pb$) between a pressure $P_S$ of the seal casing chamber 21 to which the sealing oil SO has been supplied and the pressure $P_{OUT}$ on the machine exterior side OT of the electric rotary machine casing 3 is greater than a difference ($\Delta Pa$) between the pressure $P_S$ of the seal casing chamber 21 and the pressure $P_{IN}$ on the machine interior side IN ($\Delta Pb > \Delta Pa$). Accordingly, the sealing oil SO more easily moves to the outside through the gap between the machine-exterior-side seal ring member 30b and the rotary shaft 4 than through the gap between the machine-interior-side seal ring member 30a and the rotary shaft 4, and thus the oil film may not be formed sufficiently. As a result, even when the alignment is automatically corrected properly in the machine-interior-side seal ring member 30a, the alignment may not be automatically corrected properly in the machine-exterior-side seal ring member 30b. In other words, the following performance of the machine-exterior-side seal ring member 30b is lower than the following performance of the machine-interior-side seal ring member 30a. As a result, the sealing of the cooling gas may become insufficient. This issue is becoming more prominent particularly with an increase in the pressure of the cooling gas.

Accordingly, an object of the present invention is provide a shaft sealing device that can effectively seal a cooling gas, and an electric rotary machine that can effectively seal the cooling gas.

DETAILED DESCRIPTION

A shaft sealing device according to an embodiment is disposed between an electric rotary machine casing and a rotary shaft penetrating the electric rotary machine casing. The pressure inside the electric rotary machine casing filled with a cooling gas is higher than the pressure outside the electric rotary machine casing. The shaft sealing device tightly seals the cooling gas inside the electric rotary machine casing. The shaft sealing device includes a seal casing and a seal ring. A seal casing chamber is formed inside the seal casing, and a sealing oil having a pressure higher than the pressure of the cooling gas is supplied into the seal casing chamber. The seal ring is housed in the seal casing chamber. The seal ring includes a machine-interior-side seal ring member and a machine-exterior-side seal ring member. The machine-exterior-side seal ring member is located closer to the exterior of the electric rotary machine casing than the machine-interior-side seal ring member in an axial direction of the rotary shaft. A ring gap is left between the machine-interior-side seal ring member and the machine-exterior-side seal ring member. In addition, a seal gap is left between an inner peripheral surface of the machine-interior-side seal ring member and an outer peripheral surface of the rotary shaft and between an inner peripheral surface of the machine-exterior-side seal ring member and the outer peripheral surface of the rotary shaft. The inner peripheral surface of the machine-interior-side seal ring member is a flat surface that generally follows along the outer peripheral surface of the rotary shaft. A groove extending along the direction of rotation of the rotary shaft is formed in the inner peripheral surface of the machine-exterior-side seal ring member. The sealing oil is supplied into the seal gap from the seal casing chamber via the ring gap. In addition, the sealing oil is supplied into the groove from the seal casing chamber.

First Embodiment

A shaft sealing device 10 according to a first embodiment will be described with reference to FIG. 1, FIG. 2 and FIG. 3.

Figure 1:
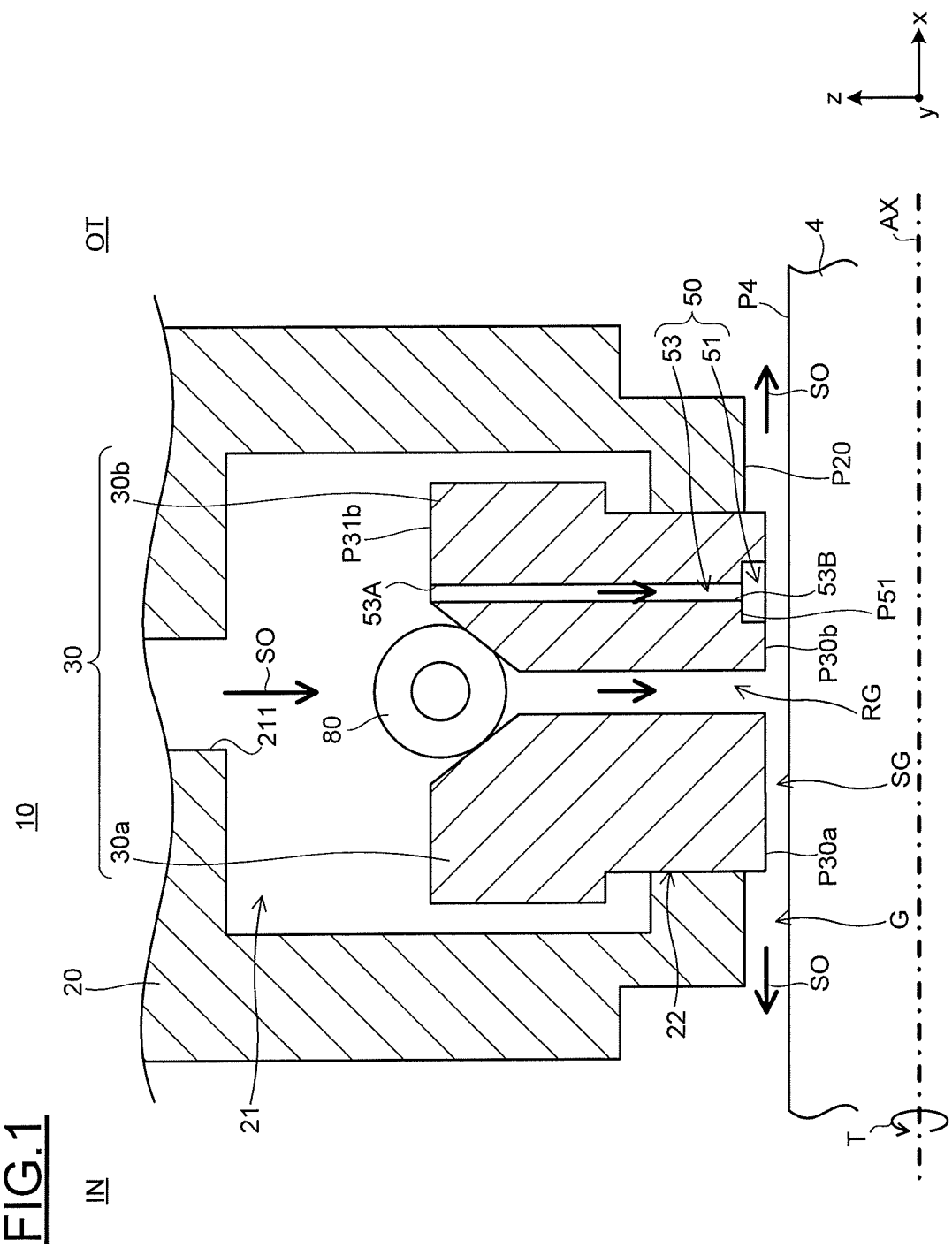
FIG. 1 illustrates a primary portion of a shaft sealing device in an electric rotary machine according to a first embodiment of the present invention.
Figure 13:
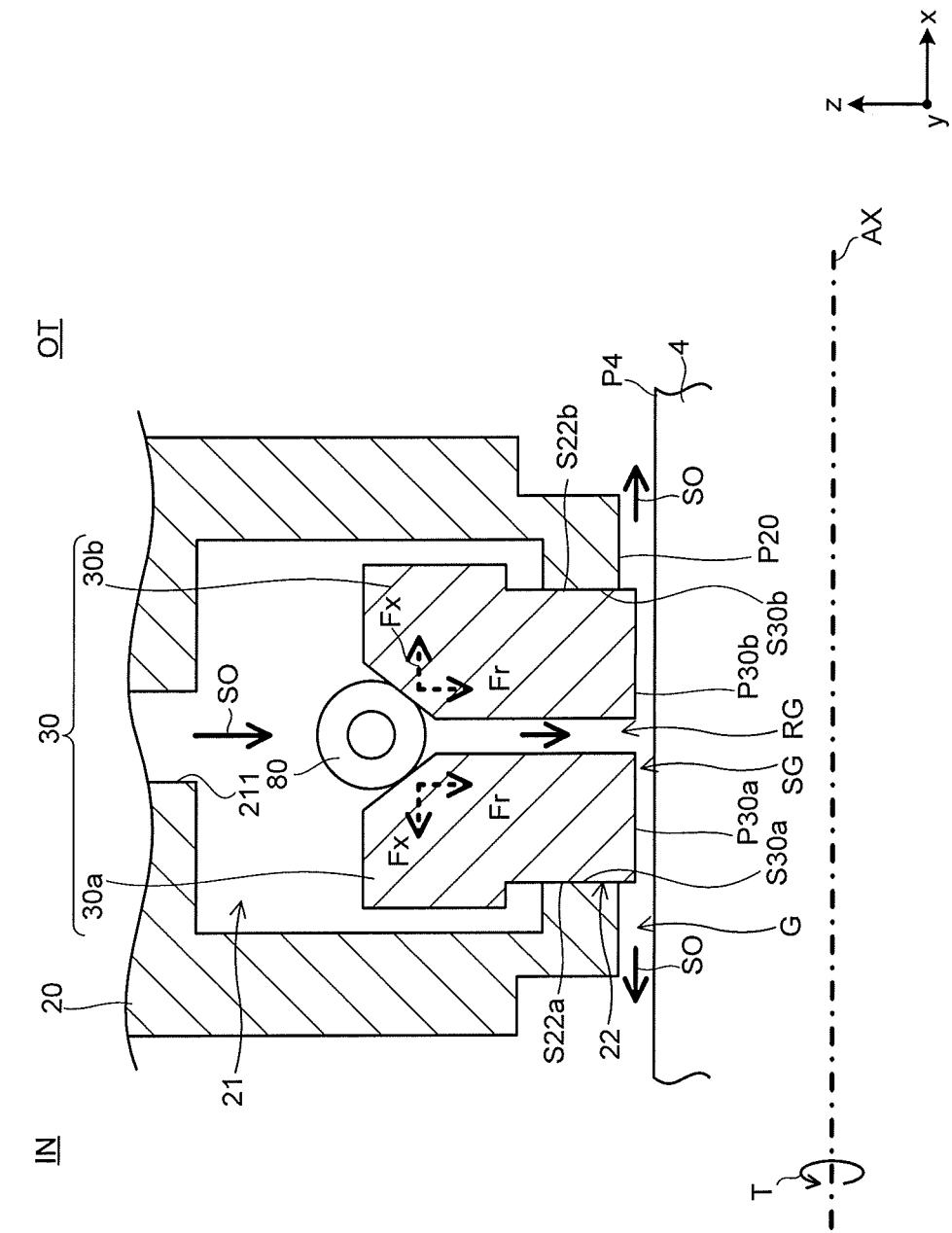
FIG. 13 illustrates a primary portion of the shaft sealing device in the electric rotary machine according to the related art.

Similar to FIG. 13, FIG. 1 illustrates a cross-sectional view of the shaft sealing device 10 taken along a vertical plane (xz plane). FIG. 2 illustrates an inner peripheral surface of a seal ring 30 of the shaft sealing device 10. In FIG. 2, the up-down direction substantially corresponds to an axial direction (x) extending along a center axis of rotation AX. The upper side is a machine interior side IN, and the lower side is a machine exterior side OT. In FIG. 2, the right-left direction substantially corresponds to a direction of rotation T. The left side is a forward side Fw in the direction of rotation T, and the right side is a backward side Bw. FIG. 3 illustrates a cross-sectional view of the shaft sealing device 10 taken along the X-X plane indicated in FIG. 2. In FIG. 3, the up-down direction substantially corresponds to a radial direction (z), and the right-left direction substantially corresponds to the direction of rotation T.

Figure 2:
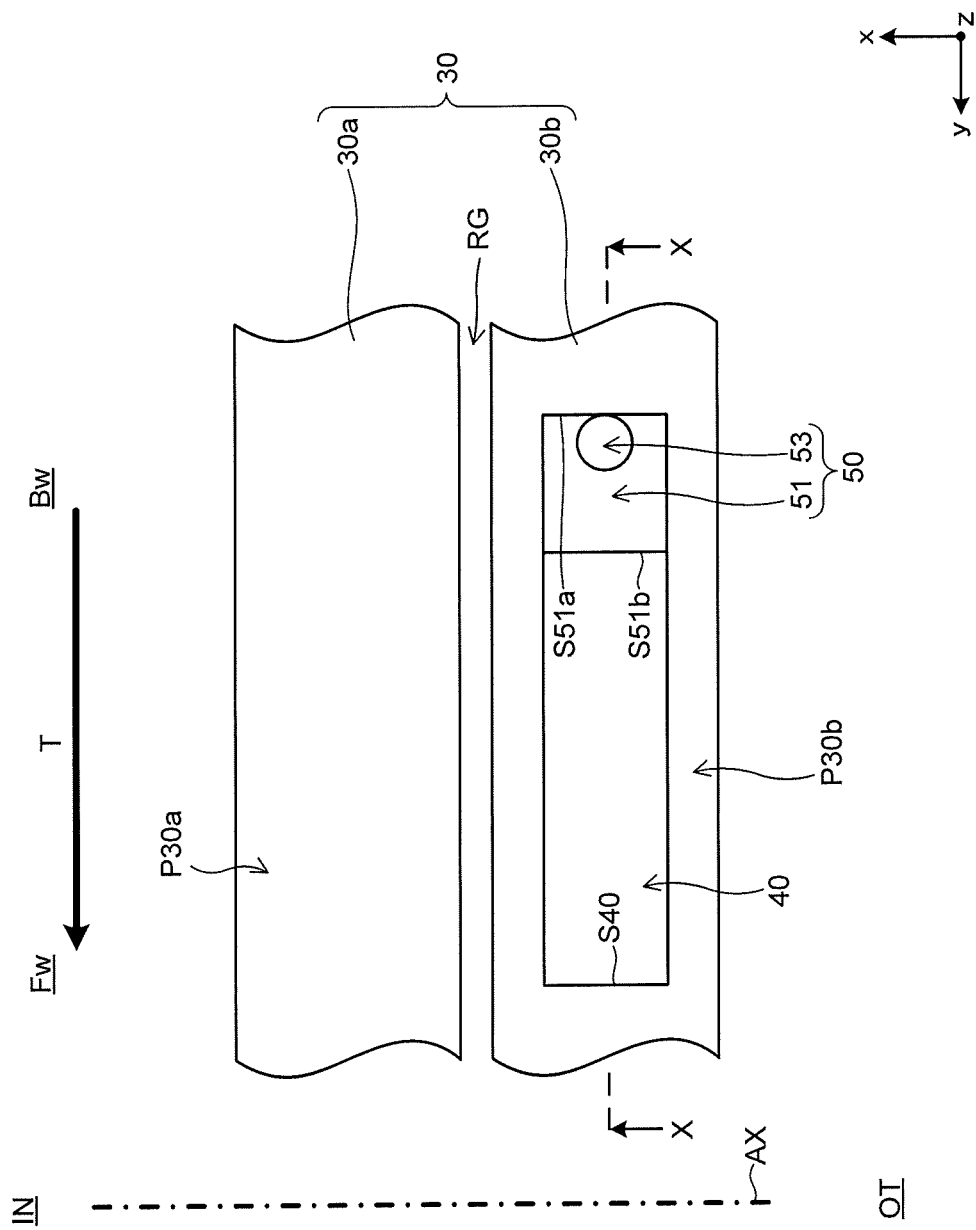
FIG. 2 illustrates another primary portion of the shaft sealing device in the electric rotary machine according to the first embodiment.

As illustrated in FIG. 1 and FIG. 2, similar to the device of the above-described related art (see FIG. 13), the seal ring 30 of the shaft sealing device 10 includes a machine-interior-side seal ring member 30*a* and a machine-exterior-side seal ring member 30*b*. The machine-interior-side seal ring member 30*a* and the machine-exterior-side seal ring member 30*b* are disposed side by side in the axial direction (x) with a ring gap RG left between the two ring members 30*a* and 30*b*.

Similar to the device of the above-described related art, an inner peripheral surface P30*a* of the machine-interior-side seal ring member 30*a* is a flat surface that generally follows along an outer peripheral surface P4 of a rotary shaft 4. In this embodiment, however, unlike the device of the above-described related art, an inner peripheral surface P30*b* of the machine-exterior-side seal ring member 30*b* is not a flat surface that generally follows along the outer peripheral surface P4 of the rotary shaft 4. In this manner, the shaft sealing device 10 of this embodiment differs from the above-described related art in terms of a part of the configuration of the seal ring 30. Other than this feature and features related thereto, this embodiment is similar to the above-described related art. Therefore, descriptions of matters that are duplicate of those of the above-described related art will be omitted as appropriate in this embodiment.

Figure 3:
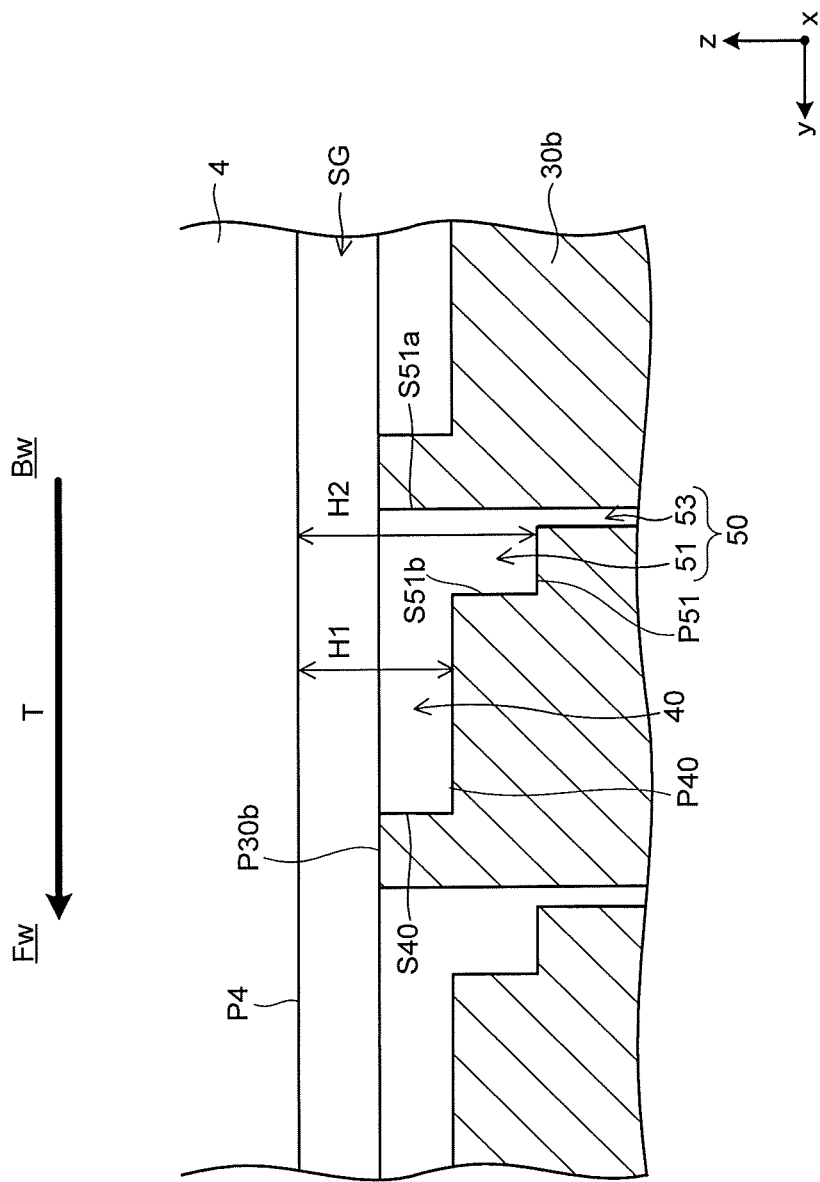
FIG. 3 illustrates still another primary portion of the shaft sealing device in the electric rotary machine according to the first embodiment.

In this embodiment, unlike the device of the above-described related art, a groove 40 and an introduction portion 50 are formed in the inner peripheral surface P30*b* of the machine-exterior-side seal ring member 30*b* (see FIG. 1 to FIG. 3). A plurality of grooves 40 and a plurality of introduction portions 50 are formed in the direction of rotation T.

The groove 40 is a groove (pocket groove) formed in the inner peripheral surface P30*b* of the machine-exterior-side seal ring member 30*b* such that the groove 40 extends along the direction of rotation T. The groove 40 is located in the inner peripheral surface P30*b* of the machine-exterior-side seal ring member 30*b* at a position closer to the forward side Fw than the introduction portion 50 in the direction of rotation T. In addition, the groove 40 is located in a middle portion of the inner peripheral surface P30*b* of the machine-exterior-side seal ring member 30*b* in the axial direction (x). A bottom surface P40 of the groove 40 opposes the outer peripheral surface P4 of the rotary shaft 4 in the radial direction (z) with a gap left between the bottom surface P40 and the outer peripheral surface P4.

A distance H1 across the gap between the bottom surface P40 of the groove 40 and the outer peripheral surface P4 of the rotary shaft 4 is constant in the direction of rotation T.

An end surface S40 of the groove 40 located on the forward side Fw in the direction of rotation T extends along the axial direction (x) and the radial direction (z).

The introduction portion 50 is located closer to the backward side Bw than the groove 40 in the direction of rotation T in the inner peripheral surface P30*b* of the machine-exterior-side seal ring member 30*b*. The introduction portion 50 is provided to introduce, into the groove 40, a sealing oil SO supplied to a seal casing chamber 21. The introduction portion 50 includes an introduction groove 51 and an introduction hole 53. The sealing oil SO is introduced into the groove 40 through the introduction hole 53 and the introduction groove 51 in order.

Of the introduction portion 50, the introduction groove 51 is located on the backward side Bw of the groove 40 in the direction of rotation T and communicates with the groove 40. Similar to the groove 40, the introduction groove 51 is located in a middle portion of the inner peripheral surface P30*b* of the machine-exterior-side seal ring member 30*b* in the axial direction (x). The introduction groove 51 is formed to have the same width as the groove 40 in the axial direction (x).

The introduction groove 51 includes a bottom surface P51, and the bottom surface P51 opposes the outer peripheral surface P4 of the rotary shaft 4 in the radial direction (z) with a gap left between the bottom surface P51 and the outer peripheral surface P4. The introduction groove 51 is formed such that a distance H2 across the gap between the bottom surface P51 of the introduction groove 51 and the outer peripheral surface P4 of the rotary shaft 4 is constant in the direction of rotation T. The distance H2 across the gap between the bottom surface P51 of the introduction groove 51 and the outer peripheral surface P4 of the rotary shaft 4 is greater than the distance H1 across the gap between the bottom surface P40 of the groove 40 and the outer peripheral surface P4 of the rotary shaft 4. In other words, the introduction groove 51 is deeper than the groove 40.

In the introduction groove 51, an end surface S51*a* (upstream end surface) located on the backward side Bw in the direction of rotation T extends along the axial direction (x) and the radial direction (z). In a similar manner, in the introduction groove 51, an end surface S51*b* (downstream end surface) located on the forward side Fw in the direction of rotation T extends along the axial direction (x) and the radial direction (z).

Of the introduction portion 50, the introduction hole 53 penetrates the inner peripheral surface P30*b* of the machine-exterior-side seal ring member 30*b* in the radial direction (z). The introduction hole 53 includes an oil inlet 53A and an oil outlet 53B. The sealing oil SO flows into the introduction hole 53 through the oil inlet 53A, and the sealing oil SO flows out through the oil outlet 53B.

The oil inlet 53A of the introduction hole 53 is, for example, circular and is provided in an outer peripheral surface P31*b* of the machine-exterior-side seal ring member 30*b*.

Similar to the oil inlet 53A of the introduction hole 53, the oil outlet 53B of the introduction hole 53 is circular, for example. The oil outlet 53B is formed in the inner peripheral surface P30*b* of the machine-exterior-side seal ring member 30*b* and communicates with the introduction groove 51. The oil outlet 53B is located on the backward side Bw of the introduction groove 51 in the direction of rotation T. The oil outlet 53B is formed such that an end portion of the oil outlet 53B that is located on the backward side Bw in the direction of rotation T coincides with the end surface S51*a* of the introduction groove 51 that is located on the backward side Bw in the direction of rotation T.

An operation of the above-described shaft sealing device 10 will be described.

In the shaft sealing device 10, similar to the device of the above-described related art, the sealing oil SO, after having been supplied into the seal casing chamber 21, flows into the ring gap RG in the seal ring 30 from the seal casing chamber 21. The sealing oil SO that has flowed into the ring gap RG is supplied to the seal gap SG left between an inner peripheral surface P30 of the seal ring 30 and the outer peripheral surface P4 of the rotary shaft 4. Specifically, the sealing oil SO is supplied to the seal gap SG left between the inner peripheral surface P30*a* of the machine-interior-side seal ring member 30*a* and the outer peripheral surface P4 of the rotary shaft 4, and the sealing oil SO is also supplied to the seal gap SG left between the inner peripheral surface P30*b* of the machine-exterior-side seal ring member 30*b* and the outer peripheral surface P4 of the rotary shaft 4. Thus, an oil film of the sealing oil SO is formed in the seal gap SG.

As described above, a difference (ΔPb) between a pressure of the seal casing chamber 21 to which the sealing oil SO has been supplied in the shaft sealing device 10 and the pressure on the machine exterior side OT of the electric rotary machine casing 3 is greater than a difference (ΔPa) between the pressure of the seal casing chamber 21 and the pressure on the machine interior side IN (ΔPb>ΔPa). Therefore, the sealing oil SO more easily moves to the outside through the gap between the machine-exterior-side seal ring member 30*b* and the rotary shaft 4 than through the gap between the machine-interior-side seal ring member 30*a* and the rotary shaft 4. Thus, the oil film of the sealing oil SO may not be formed sufficiently. As a result, the automatic alignment correction may not take place sufficiently in the machine-exterior-side seal ring member 30*b* as compared to the machine-interior-side seal ring member 30*a*.

In this embodiment, however, the groove 40 and the introduction portion 50 are formed in the inner peripheral surface P30*b* of the machine-exterior-side seal ring member 30*b*, and the sealing oil SO is supplied into the groove 40 via the introduction portion 50. Therefore, the alignment is automatically corrected properly in the machine-exterior-side seal ring member 30*b*, as in the machine-interior-side seal ring member 30*a*.

Specifically, in the machine-exterior-side seal ring member 30*b*, unlike the device of the above-described related art, the sealing oil SO supplied to the seal casing chamber 21 flows into the introduction groove 51 after having passed through the introduction hole 53. Then, the sealing oil SO that has flowed into the introduction groove 51 is introduced into the groove 40. Accordingly, the sealing oil SO is further supplied to the seal gap SG between the inner peripheral surface P30*b* of the machine-exterior-side seal ring member 30*b* and the outer peripheral surface P4 of the rotary shaft 4, and thus the oil film is formed sufficiently. As a result, in the shaft sealing device 10, the alignment is automatically corrected properly in the machine-exterior-side seal ring member 30*b*, as in the machine-interior-side seal ring member 30*a*, and the sealing performance improves.

Workings and effects of the above-described device will be described in further detail with reference to FIG. 4, FIG. 5, and FIG. 6.

Figure 4:
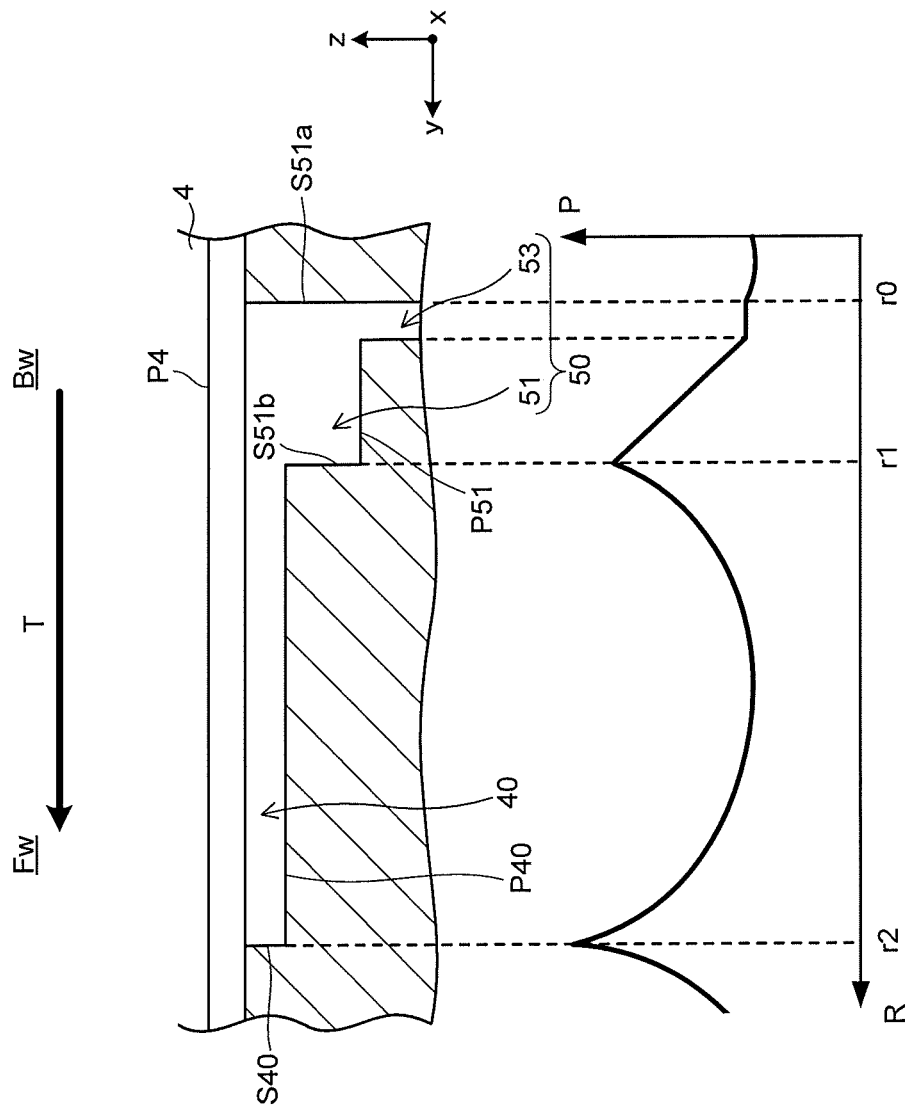
FIG. 4 illustrates a pressure distribution of a sealing oil introduced into a groove and an introduction portion in a seal ring of the shaft sealing device according to the first embodiment.
Figure 5:
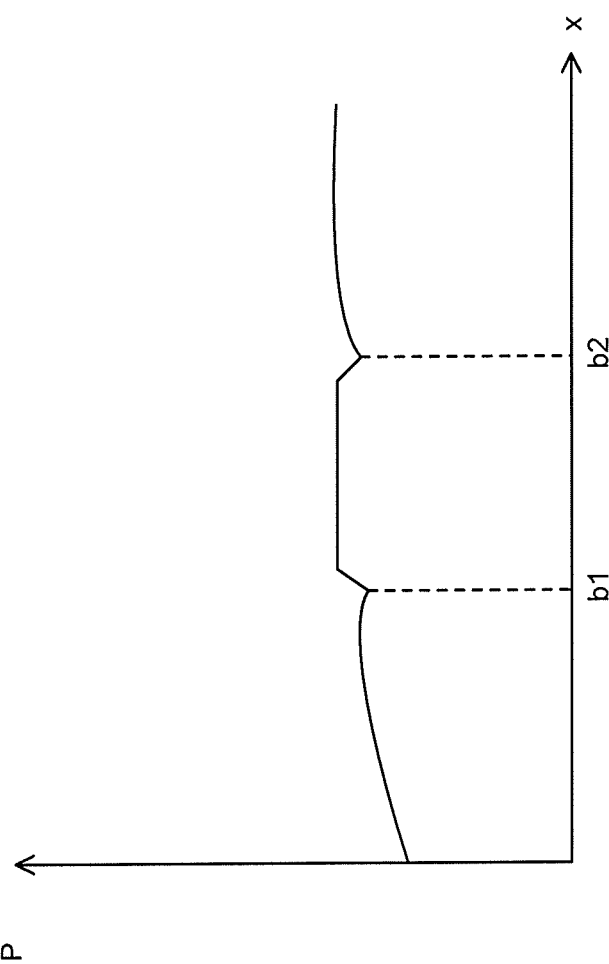
FIG. 5 illustrates a particular part of the pressure distribution of the sealing oil introduced into the groove and the introduction portion in the seal ring of the shaft sealing device according to the first embodiment.
Figure 6:
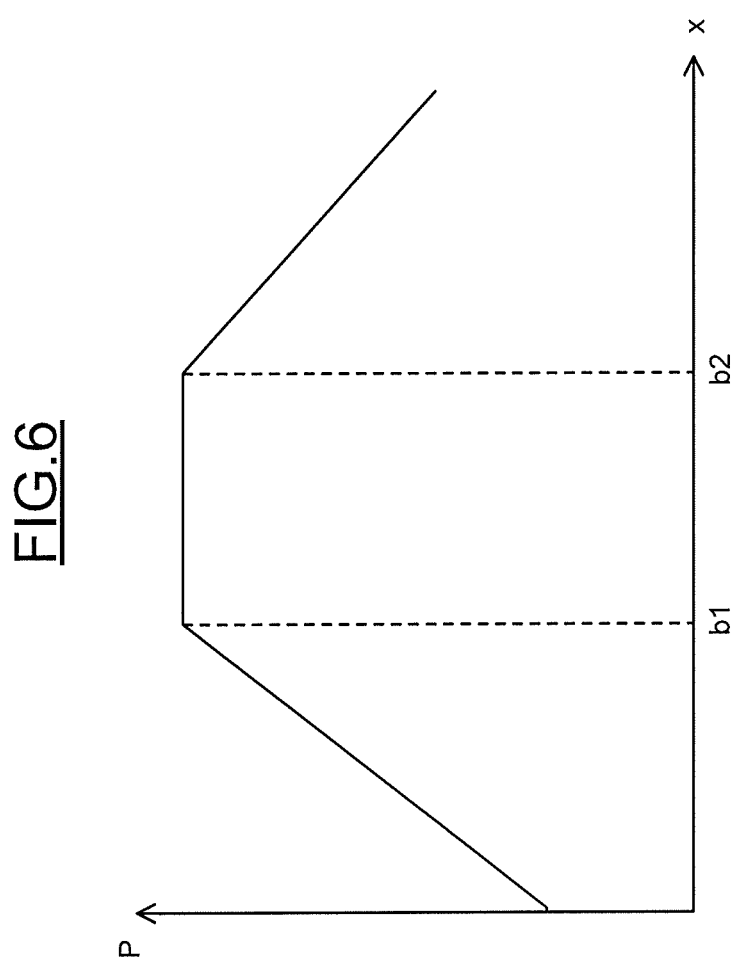
FIG. 6 illustrates another part of the pressure distribution of the sealing oil introduced into the groove and the introduction portion in the seal ring of the shaft sealing device according to the first embodiment.

FIG. 4 to FIG. 6 each illustrate a pressure distribution of the sealing oil SO introduced into the groove 40 and the introduction portion 50 in the machine-exterior-side seal ring member 30*b*. In FIG. 4, a cross-sectional view taken along the X-X plane indicated in FIG. 2 (similar to FIG. 3) is illustrated in the upper part of the drawing, and the pressure distribution of the sealing oil SO along that cross-section is illustrated in the lower part of the drawing. With regard to the pressure distribution illustrated in the lower part of FIG. 4, the vertical axis represents the pressure P (pressure), and the horizontal axis represents the position in the direction of rotation T. FIG. 5 illustrates a pressure distribution at a portion r0 (the end surface S51*a* of the introduction groove 51 that is located on the backward side Bw in the direction of rotation T) indicated in FIG. 4. The vertical axis represents the pressure P (pressure), and the horizontal axis represents the position in the axial direction (x). FIG. 6 illustrates a pressure distribution at a portion r1 (the end surface S51*b* of the introduction groove 51 that is located on the forward side Fw in the direction of rotation T) indicated in FIG. 4. The vertical axis represents the pressure P (pressure), and the horizontal axis represents the position in the axial direction (x). With regard to the horizontal axes of FIG. 5 and FIG. 6, b2 is the position of one end surface of the introduction groove 51 that is located closer to the ring gap RG, and b1 is the position of another end surface (opposite end surface) of the introduction groove 51 that is located farther from the ring gap RG.

In the machine-exterior-side seal ring member 30*b*, the sealing oil SO flows from the introduction hole 53 into the introduction groove 51 having a greater channel area than the introduction hole 53 (see FIG. 4). The introduction hole 53 is formed on the side of the end surface S51*a* (portion r0) of the introduction groove 51 that is located on the backward side Bw in the direction of rotation T. Therefore, the flow rate of the sealing oil SO increases on the side of the end surface S51*a* (portion r0), and the sealing oil SO is introduced into the introduction groove 51 without a decrease in the pressure P of the sealing oil SO.

As illustrated in FIG. 5, at the end surface S51*a* (portion r0) of the introduction groove 51 that is located on the backward side Bw in the direction of rotation T, the pressure P of the sealing oil SO is higher inside the introduction groove 51 (the range from b1 to b2) than around the introduction groove 51 (outside the range from b1 to b2).

The pressure P of the sealing oil SO inside the introduction groove 51 is uniformly distributed in the axial direction (x).

In the introduction groove 51, the sealing oil SO flows along the direction of rotation T of the rotary shaft 4. In other words, in the introduction groove 51, the sealing oil SO flows from the end surface S51a (portion r0) located on the backward side Bw in the direction of rotation T toward the end surface S51b (portion r1) located on the forward side Fw (see FIG. 4). When the sealing oil SO flows in this way, the pressure P of the sealing oil SO rises along the direction of rotation T.

As illustrated in FIG. 6, at the end surface S51b (portion r1) of the introduction groove 51 that is located on the forward side Fw in the direction of rotation T, the pressure P of the sealing oil SO is higher inside the introduction groove 51 (the range from b1 to b2) than around the introduction groove 51 (outside the range from b1 to b2). The pressure P of the sealing oil SO inside the introduction groove 51 is uniformly distributed in the axial direction (x).

As described above, in the machine-exterior-side seal ring member 30b, the pressure P of the sealing oil SO introduced into the introduction groove 51 is higher than the pressure of an oil film formed around the introduction groove 51. As a result, the sealing oil SO forming the oil film around the introduction groove 51 is less likely to enter the introduction groove 51 from the machine interior side IN. Accordingly, the cooling gas filling the interior of the electric rotary machine 1 is less likely to leak through the introduction groove 51.

Thereafter, the sealing oil SO supplied to the introduction groove 51 is introduced into the groove 40. In the groove 40, the sealing oil SO flows along the direction of rotation T of the rotary shaft 4. When the sealing oil SO is introduced from the introduction groove 51, the pressure P of the sealing oil SO decreases along the direction of rotation T. When the sealing oil SO reaches the end surface S40 (portion r2) of the groove 40 that is located on the forward side Fw in the direction of rotation T, the kinetic energy of the sealing oil SO is converted to the pressure energy. Therefore, the pressure P of the sealing oil SO, after having decreased along the direction of rotation T, rises as the sealing oil SO approaches the end surface S40 of the groove 40 that is located on the forward side Fw in the direction of rotation T. Accordingly, unlike the machine-interior-side seal ring member 30a, the pressure of the sealing oil SO in the groove 40 is further exerted on the machine-exterior-side seal ring member 30b, and thus the machine-exterior-side seal ring member 30b is pressed further toward the outer peripheral side in the radial direction (z) than the machine-interior-side seal ring member 30a.

Accordingly, unlike the device of the related art, in the inner peripheral surface P30b of the machine-exterior-side seal ring member 30b according to this embodiment, the sealing oil SO is supplied into the groove 40 via the introduction portion 50. In this embodiment, the alignment is automatically corrected properly in the machine-exterior-side seal ring member 30b, as in the machine-interior-side seal ring member 30a, and thus the sealing performance of the shaft sealing device 10 improves.

In this embodiment, unlike the inner peripheral surface P30b of the machine-exterior-side seal ring member 30b, the inner peripheral surface P30a of the machine-interior-side seal ring member 30a is a flat surface that generally follows along the outer peripheral surface P4 of the rotary shaft 4. In other words, unlike the inner peripheral surface P30b of the machine-exterior-side seal ring member 30b, the inner peripheral surface P30a of the machine-interior-side seal ring member 30a has neither the introduction portion 50 nor the groove 40 formed therein and is not configured such that the sealing oil SO is supplied into the groove 40 via the introduction portion 50. Therefore, in this embodiment, an increase in the sealing oil SO is suppressed as compared to a case in which the introduction portion 50 and the groove 40 are formed in each of the inner peripheral surface P30b of the machine-exterior-side seal ring member 30b and the inner peripheral surface P30a of the machine-interior-side seal ring member 30a, and thus the sealing oil SO can be used effectively.

Second Embodiment

A shaft sealing device 10 according to a second embodiment will be described with reference to FIG. 7. Similar to FIG. 2, FIG. 7 shows an inner peripheral surface of a seal ring 30 of the shaft sealing device 10.

Figure 7:
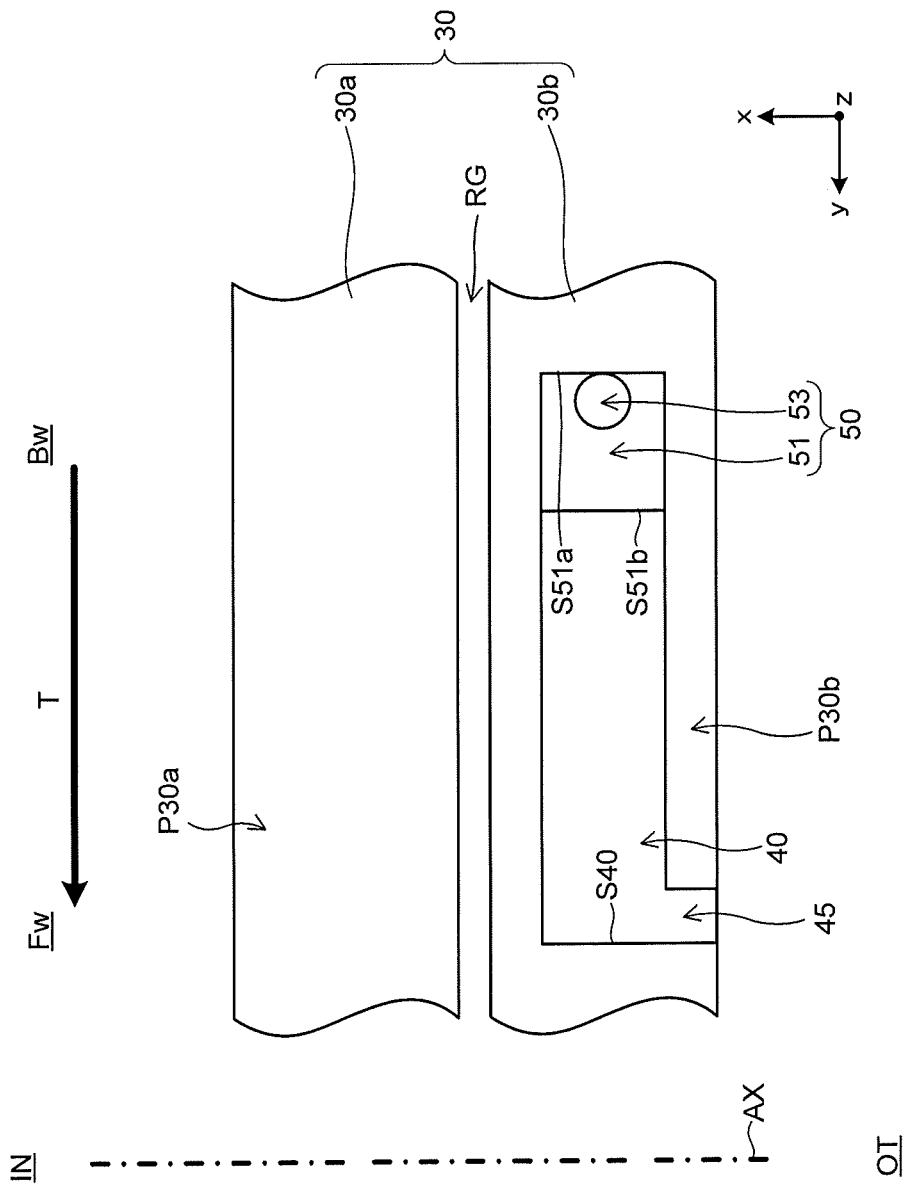
FIG. 7 is a cross-sectional view illustrating a primary portion of a shaft sealing device in an electric rotary machine according to a second embodiment.

A depicted in FIG. 7, the inner peripheral surface P30b of the machine-exterior-side seal ring member 30b of the seal ring 30 of this embodiment is partially different from that of the first embodiment (see FIG. 2). Except for this difference and associated differences, this embodiment is similar to Embodiment 1. Thus, the duplicated description between the first embodiment and the second embodiment will be omitted as appropriate in the following passages.

In this embodiment, a waste oil groove 45 is formed in the inner peripheral surface P30b of the machine-exterior-side seal ring member 30b. The waste oil groove 45 communicates with the groove 40 at a position on the forward side Fw in the direction of rotation T. The waste oil groove 45 is configured to discharge the sealing oil SO to the machine exterior side OT (exterior) of the electric rotary machine casing 3 from the groove 40. In this embodiment, the waste oil groove 45 extends along the axial direction (x), and its inlet and outlet are located at the same position when viewed in the direction of rotation T.

The operation and advantages of this embodiment will be described.

In the first embodiment, as shown in FIG. 4, the pressure of the sealing oil SO in the groove 40 of the machine-exterior-side seal ring member 30b is high at the end surface S40 that is located on the forward side Fw in the direction of rotation T. The pressure of the sealing oil SO at the end surface S40 is higher than the pressure of the sealing oil SO in the seal casing chamber 21. At the end surface S40 of the groove 40 that is located on the forward side Fw in the direction of rotation T, therefore, the sealing oil SO tends to flow to not only the machine exterior side OT of the electric rotary machine casing 3 but the machine interior side IN of the electric rotary machine casing 3. As a result, the sealing oil OS enters the gap between the inner peripheral surface P30a of the machine-interior-side seal ring member 30a and the outer peripheral surface P4 of the rotary shaft 4 from the groove 40 of the machine-exterior-side seal ring member 30b, and an amount of the sealing oil SO increases. As an amount of the sealing oil SO increases, an amount of the hydrogen gas, which is the cooling gas, to be absorbed by the sealing oil SO increases. Accordingly, an amount of the hydrogen gas, i.e., the cooling gas, to be consumed increases.

In this embodiment, however, the sealing oil OS exits to the machine exterior side OT (exterior) of the electric rotary machine casing 3 from the waste oil groove 45 of the groove 40 that is located on the forward side Fw in the direction of rotation T. In this embodiment, therefore, an amount of the sealing oil OS that flows to the machine interior side IN of the electric rotary machine casing 3 from the groove 40 of the machine-exterior-side seal ring member 30b decreases.

Thus, this embodiment can demonstrate the same advantages as the first embodiment, and can also suppress the increase in the amount of consumption of the hydrogen gas, i.e., the cooling gas.

In the above-described embodiment, described is a configuration in which the waste oil groove 45 extends along the axial direction (x), and its inlet and outlet are located at the same position when viewed in the direction of rotation T. The second embodiment is not limited to this configuration.

A shaft sealing device 10 according to a modification to the second embodiment will be described with reference to FIG. 8. Similar to FIG. 7, FIG. 8 shows an inner peripheral surface of a seal ring 30 of the shaft sealing device 10.

Figure 8:
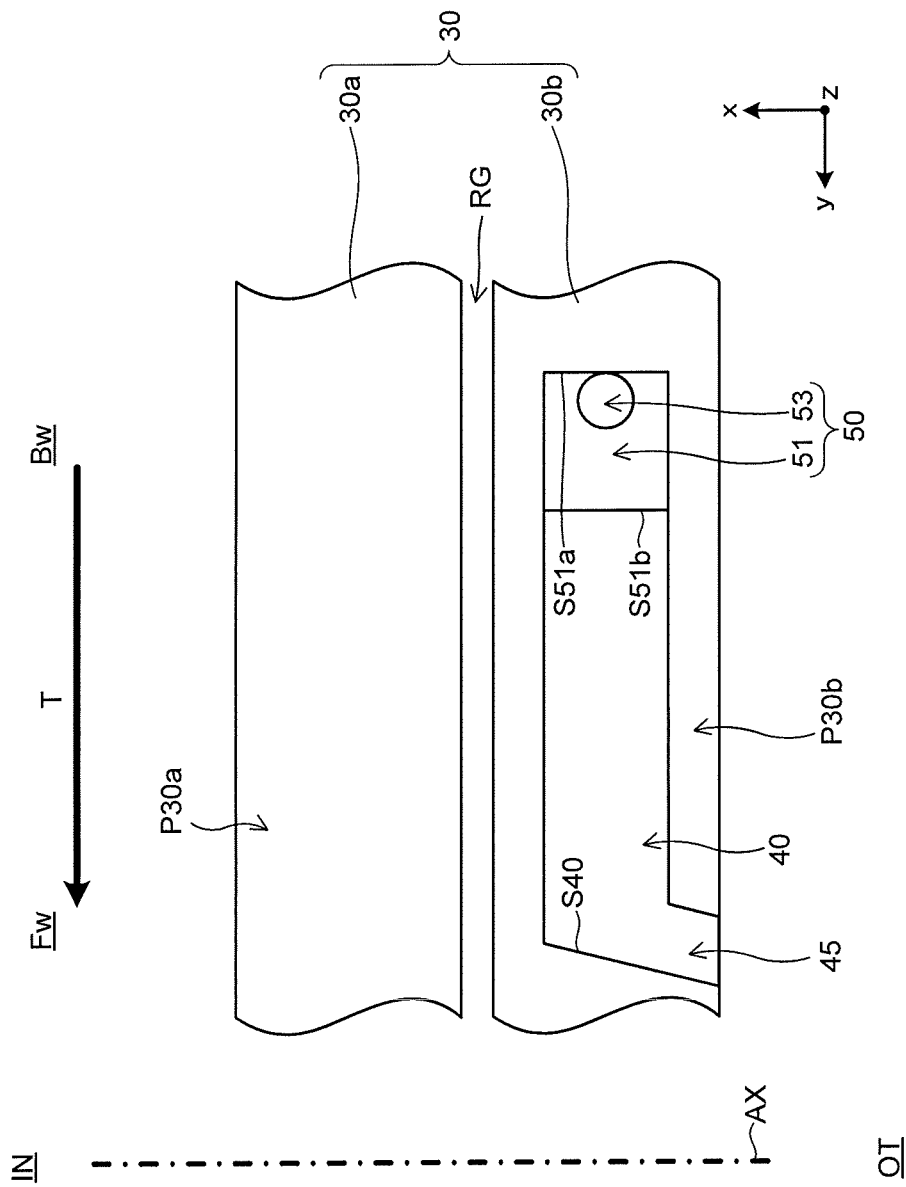
FIG. 8 illustrates a primary portion of a shaft sealing device according to a modification of the second embodiment.

As shown in FIG. 8, the extending direction of the waste oil groove 45 may incline relative to the direction of rotation T such that the inlet of the waste oil groove 45 is located closer to the forward side Fw than the outlet of the waste oil groove 45 when viewed in the direction of rotation T. Similar to the extending direction of the waste oil groove 45, the end surface S40 of the groove 40 of the machine-exterior-side seal ring member 30b that is located on the forward side Fw in the direction of rotation T may incline relative to the direction of rotation T. With this configuration, a resistance to the flow of the sealing oil SO drops. As a result, it is possible to further advantageously decrease an amount of the sealing oil SO that flows to the machine interior side IN of the electric rotary machine casing 3 from the groove 40 of the machine-exterior-side seal ring member 30b. This modified embodiment, therefore, can suppress the increase in the amount of consumption of the hydrogen gas, i.e., the cooling gas, in a more effective manner.

Third Embodiment

Figure 9:
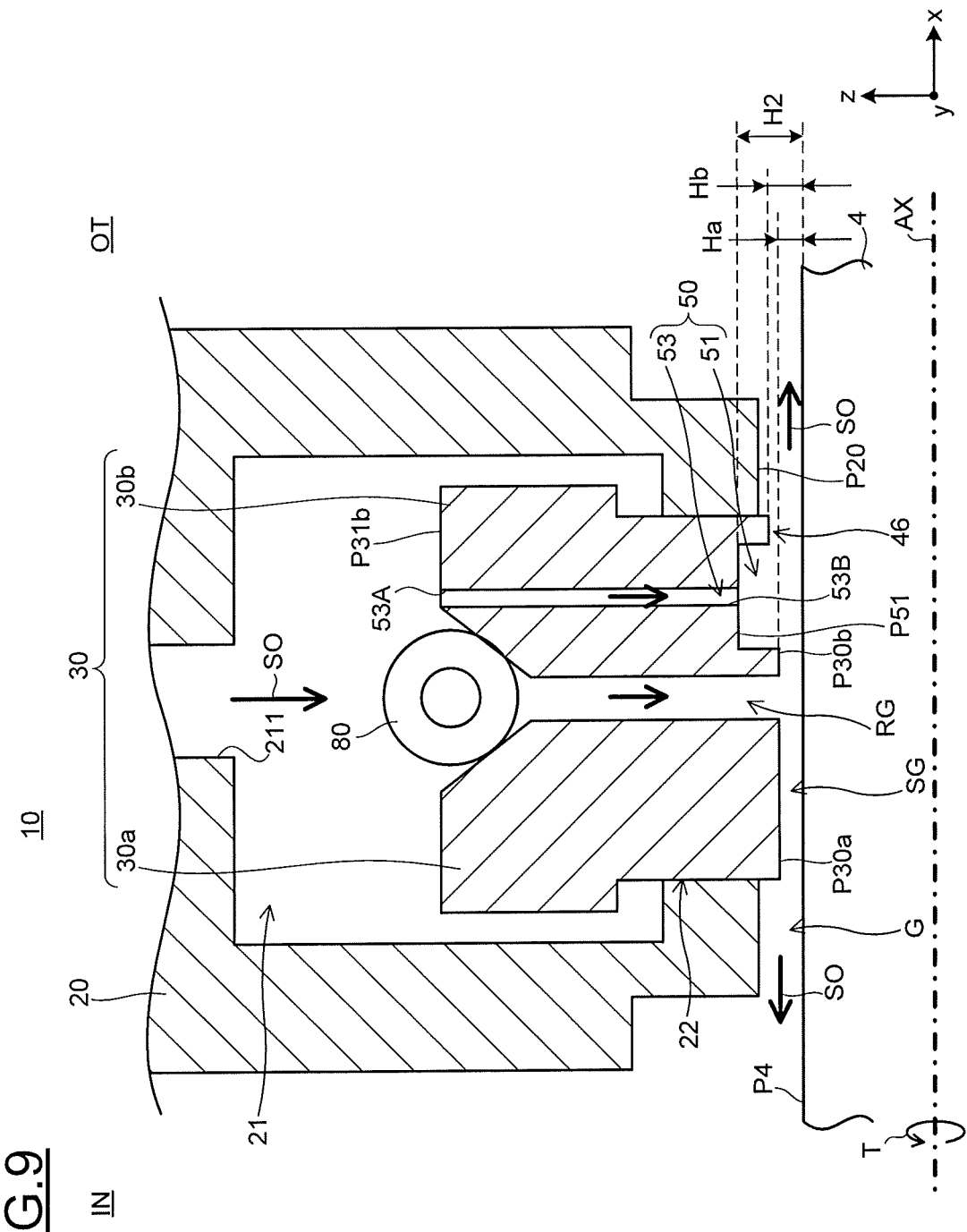
FIG. 9 illustrates a primary portion of a shaft sealing device in an electric rotary machine according to a third embodiment.

A shaft sealing device 10 according to a third embodiment will be described with reference to FIG. 9 and FIG. 10. Similar to FIG. 1, FIG. 9 illustrates a cross-sectional view of the shaft sealing device 10 taken along a vertical plane (xz plane). Similar to FIG. 2, FIG. 10 illustrates an inner peripheral surface of a seal ring 30 of the shaft sealing device 10.

Figure 10:
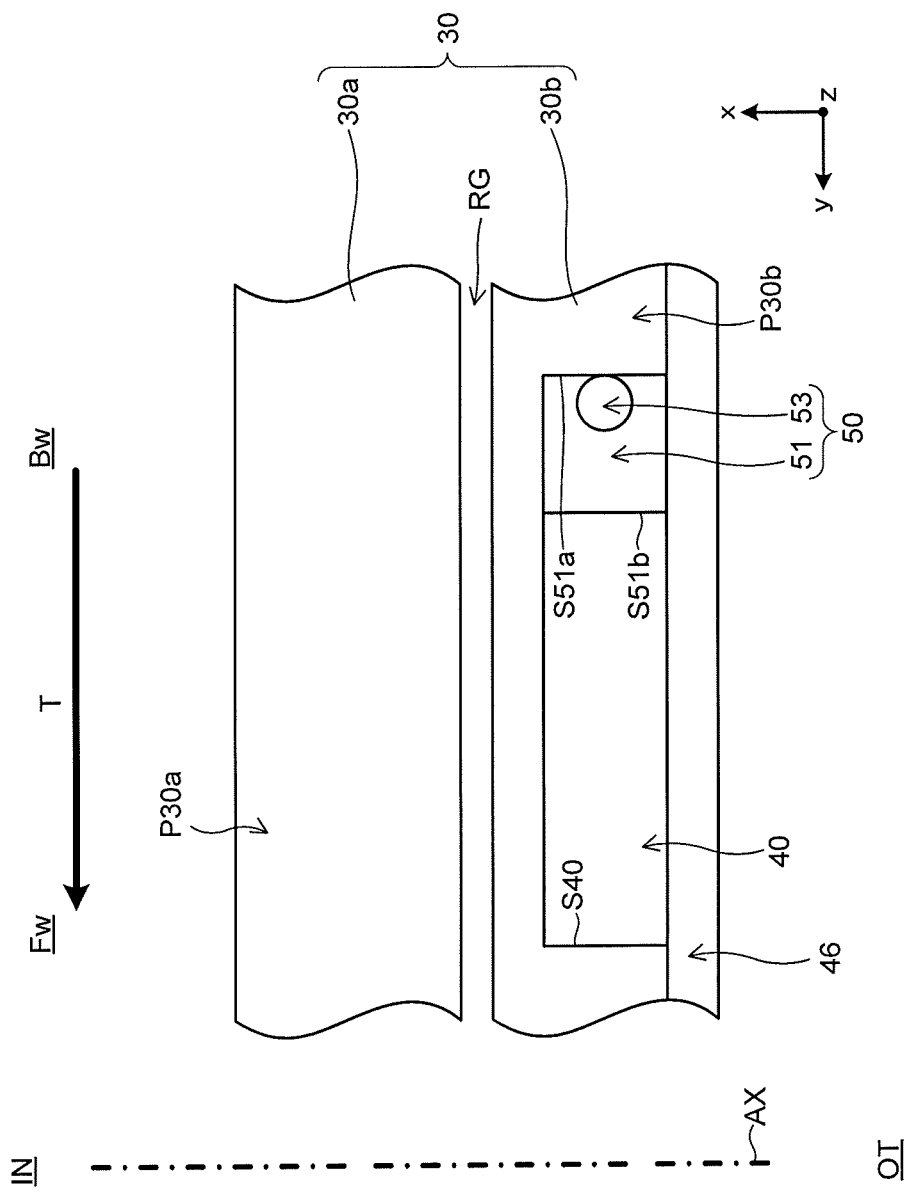
FIG. 10 illustrates another primary portion of the shaft sealing device in the electric rotary machine according to the third embodiment.

As shown in FIG. 9 and FIG. 10, the inner peripheral surface P30b of the machine-exterior-side seal ring member 30b of the seal ring 30 of this embodiment is partially different from that of the first embodiment (see FIG. 1 and FIG. 2). Except for this difference and associated differences, this embodiment is similar to Embodiment 1. Thus, the duplicated description between the first embodiment and the third embodiment will be omitted as appropriate in the following passages.

In this embodiment, a waste oil opening 46 is formed in the inner peripheral surface P30b of the machine-exterior-side seal ring member 30b such that the waste oil opening 46 is provided in a portion closer to the machine exterior side OT than the groove 40. The waste oil opening 46 is formed in the ring shape along the direction of rotation T.

Because of the waste oil opening 46, the portion, which is closer to the machine exterior side OT than the groove 40, of the inner peripheral surface P30b of the machine-exterior-side seal ring member 30b is more distant from the outer peripheral surface P4 of the rotary shaft 4 than a portion, which is closer to the machine interior side IN than the groove 40, of the inner peripheral surface P30b of the machine-exterior-side seal ring member 30b. In other words, a distance Hb between the inner peripheral surface P30b of the machine-exterior-side seal ring member 30b that is located closer to the machine exterior side OT than the groove 40 and the outer peripheral surface P4 of the rotary shaft 4 is longer than a distance Ha between the inner peripheral surface P30b of the machine-exterior-side seal ring member 30b that is located closer to the machine interior side IN than the groove 40 and the outer peripheral surface P4 of the rotary shaft 4.

In this embodiment, as described above, the waste oil opening 46 is formed in the portion of the inner peripheral surface P30b of the machine-exterior-side seal ring member 30b that is closer to the machine exterior side OT than the groove 40. Thus, the seal gap SG between the machine-exterior-side seal ring member 30b and the rotary shaft 4 is greater in the portion, which is closer to the machine exterior side OT than the groove 40, than in the portion, which is closer to the machine interior side IN than the groove 40. Thus, the sealing oil SO supplied to the groove 40 of the machine-exterior-side seal ring member 30b tends to flow to the machine exterior side OT than to the machine interior side IN. As a result, in this embodiment, an amount of the sealing oil SO that flows to the machine interior side IN of the electric rotary machine casing 3 from the groove 40 of the machine-exterior-side seal ring member 30b decreases.

This embodiment, therefore, can suppress the increase in the amount of consumption of the hydrogen gas, i.e., the cooling gas, as understood from the description of the second embodiment.

Fourth Embodiment

An electric rotary machine 1 according to a fourth embodiment will be described with reference to FIG. 11. Similar to FIG. 1, FIG. 11 illustrates a cross-sectional view of a portion of the electric rotary machine 1, on which the shaft sealing device 10 is provided, taken along a vertical plane (xz plane).

Figure 11:
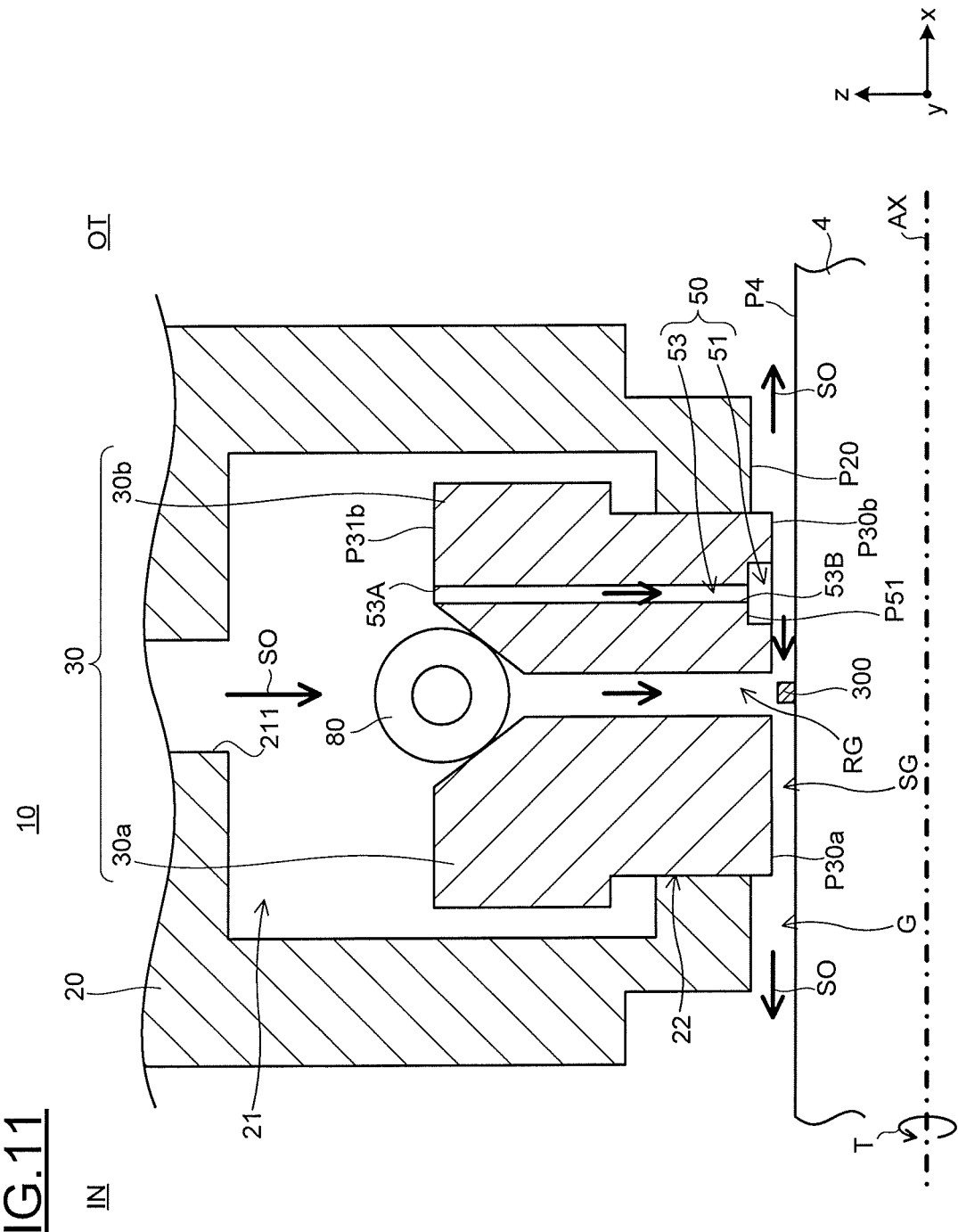
FIG. 11 illustrates a portion in which a shaft sealing device is provided in an electric rotary machine according to a fourth embodiment.
Figure 12:
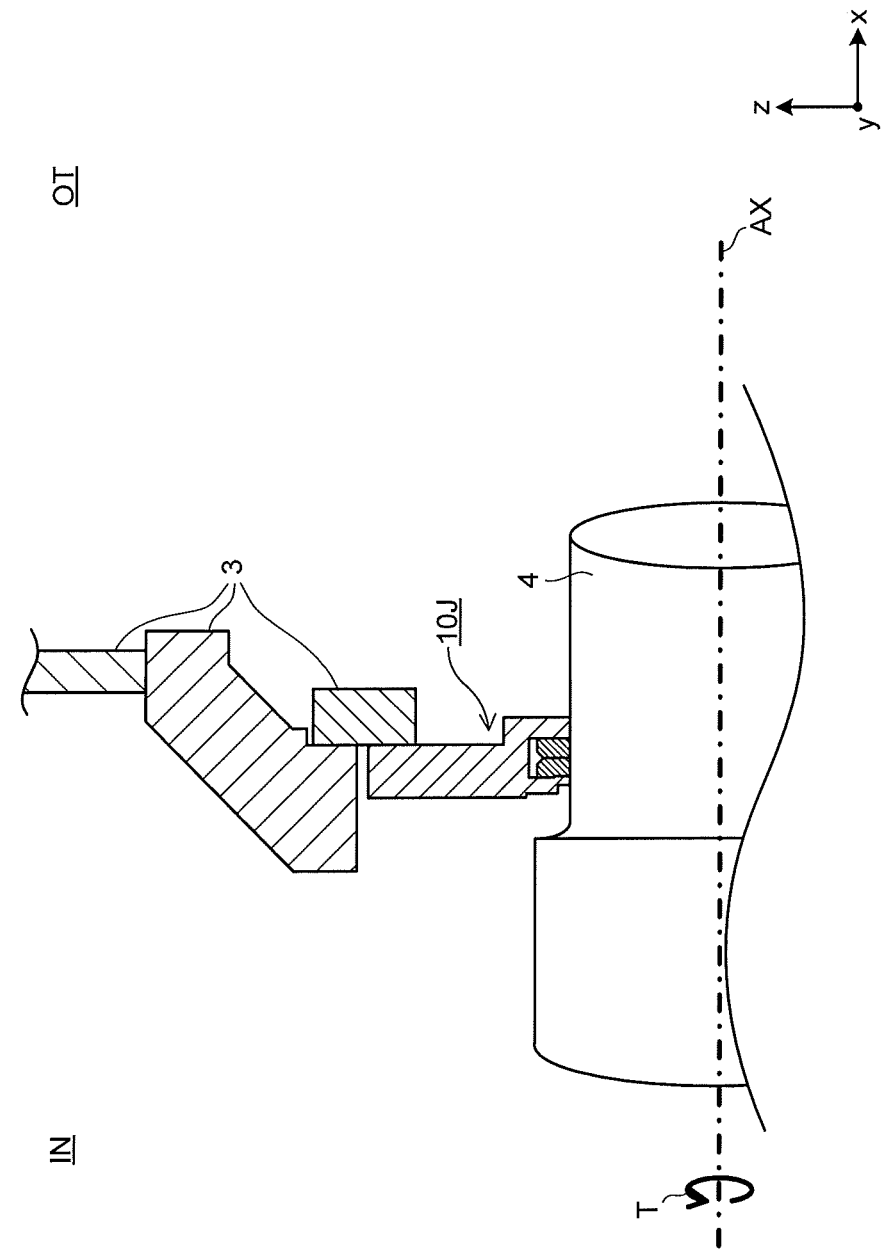
FIG. 12 is a fragmentary cross-sectional view illustrating a primary portion of an electric rotary machine according to a related art.

As shown in FIG. 11, a protrusion 300 is formed on the outer peripheral surface P4 of the rotary shaft 4 of the electric rotary machine 1 in this embodiment. Except for this configuration and associated structures, this embodiment is similar to Embodiment 1. Thus, the duplicated description between the first embodiment and the fourth embodiment will be omitted as appropriate in the following passages.

The protrusion 300 stands (protrudes) in the radial direction (z) of the rotary shaft 4, and has a ring shape that extends in the direction of rotation T.

In this embodiment, the protrusion 300 is provided on the outer peripheral surface P4 of the rotary shaft 4 at a portion closer to the machine interior side TN of the electric rotary machine casing 3 than the groove 40 of the machine-exterior-side seal ring member 30b. Specifically, the protrusion 300 is provided at the portion of the outer peripheral surface P4 of the rotary shaft 4 that faces the ring gap RG.

In this embodiment, therefore, the flow of the sealing oil SO supplied to the groove 40 of the machine-exterior-side seal ring member 30b, which is directed to the machine interior side IN of the electric rotary machine casing 3, is hindered by the protrusion 300. As a result, in this embodiment, an amount of the sealing oil SO that flows to the machine interior side IN of the electric rotary machine casing 3 from the groove 40 of the machine-exterior-side seal ring member 30b decreases.

This embodiment, therefore, can suppress the increase in the amount of consumption of the hydrogen gas, i.e., the cooling gas, as understood from the description of the second embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A shaft sealing device disposed between an electric rotary machine casing and a rotary shaft penetrating the electric rotary machine casing, an interior of the electric rotary machine casing being filled with a cooling gas such that the interior of the electric rotary machine casing has a higher pressure than an exterior of the electric rotary machine casing, the shaft sealing device configured to seal the cooling gas in the interior of the electric rotary machine casing, the shaft sealing device comprising:
a seal casing having a seal casing chamber formed therein, such that a sealing oil having a higher pressure than the cooling gas is supplied to the seal casing chamber; and
a seal ring housed in the seal casing chamber, the seal ring including:
a machine-interior-side seal ring member; and
a machine-exterior-side seal ring member located closer to the exterior of the electric rotary machine casing than the machine-interior-side seal ring member in an axial direction of the rotary shaft,
a ring gap being left between the machine-interior-side seal ring member and the machine-exterior-side seal ring member, and a seal gap being left between an inner peripheral surface of the machine-interior-side seal ring member and an outer peripheral surface of the rotary shaft and between an inner peripheral surface of the machine-exterior-side seal ring member and the outer peripheral surface of the rotary shaft,
the inner peripheral surface of the machine-interior-side seal ring member being a flat surface that generally follows along the outer peripheral surface of the rotary shaft, and a groove extending along a direction of rotation of the rotary shaft being formed in the inner peripheral surface of the machine-exterior-side seal ring member, and
the sealing oil being supplied into the seal gap from the seal casing chamber via the ring gap, and the sealing oil being also supplied into the groove from the seal casing chamber, wherein
an introduction groove is formed in the inner peripheral surface of the machine-exterior-side seal ring member to introduce the sealing oil to the groove from the seal casing chamber, and
the introduction groove is located closer to a backward side than the groove in the direction of rotation.

2. The shaft sealing device according to claim 1, wherein
a waste oil groove is formed in the inner peripheral surface of the machine-exterior-side seal ring member to discharge the sealing oil to the exterior of the electric rotary machine casing from the groove, and
the waste oil groove is located on a forward side of the groove in the direction of rotation.

3. The shaft sealing device according to claim 2, wherein the waste oil groove inclines relative to the direction of rotation such that an inlet of the waste oil groove is located closer to the forward side than an outlet of the waste oil groove when viewed in the direction of rotation.

4. The shaft sealing device according to claim 1, wherein the seal gap is greater in a portion, which is closer to the exterior of the electric rotary machine casing than the groove, than in another portion, which is closer to the interior of the electric rotary machine casing than the groove.

5. An electric rotary machine comprising:
an electric rotary machine casing, an interior of which is filled with a cooling gas such that the interior of the electric rotary machine casing has a higher pressure than an exterior of the electric rotary machine casing;
a rotary shaft penetrating the electric rotary machine casing; and
a shaft sealing device disposed between the electric rotary machine casing and the rotary shaft, and configured to seal the cooling gas in the interior of the electric rotary machine casing, the shaft sealing device including:
a seal casing having a seal casing chamber formed therein, such that a sealing oil having a higher pressure than the cooling gas is supplied to the seal casing chamber; and
a seal ring housed in the seal casing chamber, the seal ring including:
a machine-interior-side seal ring member; and
a machine-exterior-side seal ring member located closer to the exterior of the electric rotary machine casing than the machine-interior-side seal ring member in an axial direction of the rotary shaft,
a ring gap being left between the machine-interior-side seal ring member and the machine-exterior-side seal ring member, and a seal gap being left between an inner peripheral surface of the machine-interior-side seal ring member and an outer peripheral surface of the rotary shaft and between an inner peripheral surface of the machine-exterior-side seal ring member and the outer peripheral surface of the rotary shaft,
the inner peripheral surface of the machine-interior-side seal ring member being a flat surface that generally follows along the outer peripheral surface of the rotary shaft, and a groove extending along a direction of rotation of the rotary shaft being formed in the inner peripheral surface of the machine-exterior-side seal ring member, and
the sealing oil being supplied into the seal gap from the seal casing chamber via the ring gap, and the sealing oil being also supplied into the groove from the seal casing chamber, wherein
an introduction groove is formed in the inner peripheral surface of the machine-exterior-side seal ring member to introduce the sealing oil to the groove from the seal casing chamber, and
the introduction groove is located closer to a backward side than the groove in the direction of rotation.

6. The electric rotary machine according to claim 5, wherein a protrusion that protrudes in a radial direction of the rotary shaft is formed on the outer peripheral surface of the rotary shaft at a portion closer to the interior of the electric rotary machine casing than the groove.

* * * * *